(12) United States Patent
Amantea et al.

(10) Patent No.: US 6,359,795 B1
(45) Date of Patent: Mar. 19, 2002

(54) SOFT-SWITCHING POWER SUPPLY WITH AUXILIARY RESONATOR

(75) Inventors: Robert Amantea, Manalapan; Timothy Allen Pletcher, Eastampton, both of NJ (US); Jae-Hong Joo, Kyunggi-Do; Min-Sung Yang, Seoul, both of (KR)

(73) Assignees: Sarnoff Corporation, Princeton, NJ (US); Daewoo Electronics Co. Ltd., Seoul (KR)

( * ) Notice: Subject to any disclaimer, the term of this patent is extended or adjusted under 35 U.S.C. 154(b) by 0 days.

(21) Appl. No.: 09/501,941

(22) Filed: Feb. 10, 2000

Related U.S. Application Data

(60) Provisional application No. 60/126,525, filed on Mar. 26, 1999.

(51) Int. Cl.[7] .............................................. H02M 3/335
(52) U.S. Cl. .............................. 363/21.01; 363/21.16; 363/97
(58) Field of Search ................. 363/20, 21.01, 363/40, 95, 97, 131, 21.16

(56) References Cited

U.S. PATENT DOCUMENTS

| | | | | |
|---|---|---|---|---|
| 4,607,195 A | * | 8/1986 | Valkestijn et al. | 315/410 |
| 4,646,217 A | * | 2/1987 | Baroni et al. | 363/17 |
| 4,780,696 A | | 10/1988 | Jirka | |
| 4,963,795 A | * | 10/1990 | Nilssn | 315/205 |
| 5,416,386 A | * | 5/1995 | Nilssen | 315/209 R |
| 5,477,131 A | | 12/1995 | Gegner | |
| 5,751,560 A | * | 5/1998 | Yokoyama | 363/18 |
| 5,880,940 A | | 3/1999 | Poon | |
| 6,061,253 A | * | 5/2000 | Igarashi et al. | 363/19 |

FOREIGN PATENT DOCUMENTS

| | | |
|---|---|---|
| EP | 0766372 | 4/1994 |
| JP | 10215570 | 11/1998 |

* cited by examiner

Primary Examiner—Adolf Deneke Berhane
(74) Attorney, Agent, or Firm—William J. Burke (57) ABSTRACT

A converter utilizing a multifilar transformer having its primary and auxiliary windings made simultaneously, a technique known as bifilar winding, provides high efficiency and low noise. The multifilar winding technique yields minimum leakage inductance between the windings and reduces the proximity effect to a minimum achievable using most well-known wires. The converter utilizes an improved soft-switcher topology which advantageously reduces the interwinding capacitance between the primary and auxiliary windings of the transformer. The topology includes a resonant LC circuit interposed in series with one leg of the auxiliary winding and the auxiliary switch. The other leg of the auxiliary winding is at ground. A controller is provided to control switch timing such that the converter optimizes switch loss and resonant pulse loss.

21 Claims, 7 Drawing Sheets

SOFT-SWITCHING POWER SUPPLY WITH AUXILIARY RESONATOR

This Application claims the benefit of U.S. Provisional Application Ser. No. 60/126,525 filed Mar. 26, 1999.

FIELD OF THE INVENTION

The invention relates generally to power supplies for electronic devices, and more particularly to soft-switching power supplies.

BACKGROUND

Regulated power supplies are found in virtually all electronic devices, including battery chargers, cellular telephones, computers, computer monitors, televisions, audio equipment, and video cameras. One typical power supply, the DC to DC converter, operates from a DC source, generates an alternating current as an intermediate process, and delivers direct current to a load. Switched DC converters, like linear, transformer-based power supplies, deliver regulated output and provide isolation between input and output circuits. Unlike a linear power supply, however, the transformers in a switched DC converter operate at much higher frequencies, as high as several megahertz. This permits the use of small components, including transformers and capacitors, while still providing for complete isolation between the input and the output.

Despite the advantages of switched DC converters, they are known to introduce radiated losses during switching. In hard-switching topologies, for example, switching causes a rapid transition in the current through the switch. This rapid transition causes switching losses in the form of signal emissions. These switching transients have a spectrum containing high frequency components, which can introduce noise in video signals or the like. The soft-switching switching converter is a known converter topology that reduces hard switching losses. In a typical soft-switcher, a resonator forces the current in the power switches to zero during switching. This significantly reduces switching transients and the radiated emissions caused by rapid transitions in the switching current.

Soft-switchers, however, also fail to achieve optimum efficiency. Leakage inductance between the primary and auxiliary windings of the transformers commonly used in soft-switchers introduces power loss; the uncoupled magnetic flux causes voltage peaks during the current changes induced by switching. These switching transients also contain high frequency components that appear as radiated emissions. Furthermore, in known soft-switching topologies, the interwinding capacitance between the primary and auxiliary windings appears in the resonator circuit loop. This capacitance introduces secondary oscillations and concomitant power losses. Due to the "proximity effect," soft-switchers also experience significant eddy current losses. The time varying current in the primary winding causes a non-uniform current distribution over the cross section of the conductors in the auxiliary winding.

SUMMARY OF THE INVENTION

A soft-switching power supply according to the principles of the invention reduces radiated emissions and the secondary oscillations caused by interwinding capacitance in the transformer. The resonator is coupled between one leg of the transformer auxiliary winding and an auxiliary switch network. The primary winding is interposed between a voltage and a primary switch network. The primary switch network and the auxiliary switch network control the application of energy to the primary and auxiliary windings. The resonator forces the current in the switch to the desired level during switching. Regulation is achieved by feeding back the output voltage (voltage mode) or the current in the primary switch (current mode) to a controller that provides the switch control signals for the primary and auxiliary switches. By placing the resonator in series with the auxiliary switch network, the effect of the interwinding capacitance is reduced; the interwinding capacitance couples to ground through the other leg of the auxiliary winding.

This topology permits the use of transformers with closer coupling than has been previously used in soft-switching topologies. Two such transformers are the multifilar or bifilar transformer. In a bifilar transformer, the primary windings and the auxiliary windings are made together and interleaved so that adjacent wires always belong to a different winding. In multifilar windings, each winding contains multiple strands of interleaved wires. These winding techniques yield closer coupling, minimize leakage inductance and reduce eddy current loss due to the proximity effect.

BRIEF DESCRIPTION OF THE DRAWINGS

A more complete understanding of the present invention may be obtained from consideration of the following description in conjunction with the drawings in which.

DETAILED DESCRIPTION

A power supply according to the principles of the invention provides for high efficiency, low noise and a strongly regulated output. The power supply is suitable for use with a wide range of electronic devices, including televisions, computer monitors, personal computers, cellular telephones, communications equipment, audio equipment, radar and other like equipment. This description sets forth an exemplary topology for the power supply, which includes a bifilar transformer to reduce losses due to the proximity effect and to reduce leakage inductance between the primary windings and the auxiliary windings. The topology can also use a multifilar transformer. Operation of an exemplary power supply is explained with reference to an examplary voltage mode controller and an exemplary current mode controller.

A. Power Supply Topology

Figure 1:
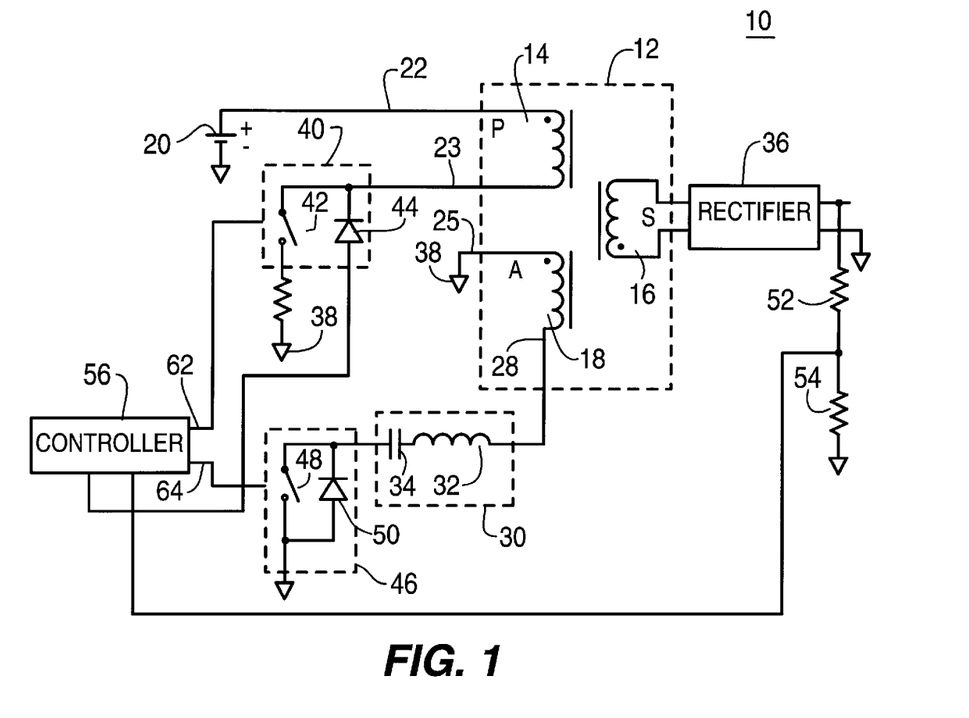
FIG. 1 shows an exemplary converter topology.

A power supply topology according to the principles of the invention is shown FIG. 1. It should be apparent to one of ordinary skill in the art that various components and component values can be used in this topology without departing from the principles of the invention. This switcher topology 10 includes a transformer 12 having primary 14, auxiliary 18 and secondary 16 windings. One leg of the primary winding 22 is coupled to a first voltage 20. The other leg is connected in series with a primary switch network 40, which in turn couples to ground 38 through a resistor 39. The auxiliary winding 18 has a first leg 25 coupled to ground 38 and a second leg 28 coupled in series with a resonator 30. The resonator 30 couples to an auxiliary switch network 46. The secondary 31 includes the transformer secondary 16 and an output rectifier 36 for providing a regulated DC voltage.

The primary switch network 40 includes a primary switch 42 coupled in parallel with a primary commutation diode 44. The auxiliary switch network 46 includes an auxiliary switch 48 in parallel with an auxiliary commutation diode 50. These switch networks 40 and 46 control the current through the primary and auxiliary windings, respectively. The primary commutation diode 44 clamps the primary switch 42 voltage to zero when the primary switch 42 is closed and provides a primary current signal to a controller 56. The controller 56 in turn provides switching control signals at its outputs 62 and 64, which control the primary switch 42 and the auxiliary switch 48, respectively. The resonator 30, an LC (32, 34) circuit, forces the voltage in the auxiliary switch 48 and the current in the primary switch 42 to desired levels during on-off transitions. As is known in the art, the primary and auxiliary switches 42 and 48 can be transistors or other switching devices. Scaling resistors 52 and 54 provide a scaled DC output voltage which feeds back to the controller 56.

This topology 10 represents an improvement over known switching topologies, because the resonator 30 is in series with the auxiliary switch network 46. This significantly reduces the effect of interwinding capacitance between the primary winding 14 and the auxiliary winding 18. Interwinding capacitance arises from the close coupling between these windings 14 and 18. In known switching topologies, the resonator is coupled to the auxiliary winding such that the interwinding capacitance introduces a significant secondary oscillation frequency in the resonator loop of the circuit. In the switching topology 10 according to the principles of the invention, the majority of the interwinding capacitance is shunted to ground, thereby minimizing secondary oscillation.

Figure 2A:
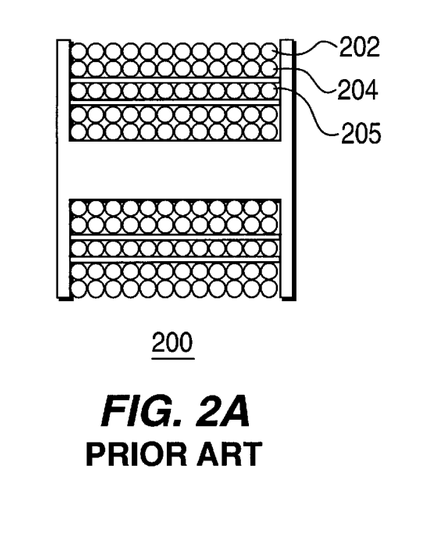
FIG. 2A shows an exemplary prior art transformer.

In the exemplary embodiment, the power supply uses a transformer having bifilar windings to provide closer coupling between the primary 14 and auxiliary 18, and to reduce eddy current losses. Referring to FIG. 2A, there is shown a cross-section of a conventional transformer 200 typically used in soft-switching power supplies. In this transformer 200, the primary windings 202 and the auxiliary windings 204 are made independently; the primary windings 202 are adjacent to primary windings 202 and the auxiliary windings 204 are adjacent to auxiliary windings 204. Although the primary 202 and auxiliary windings 204 are separated by the secondary windings 205, these transformers are a significant source of loss due to leakage inductance and the proximity effect.

Figure 2B:
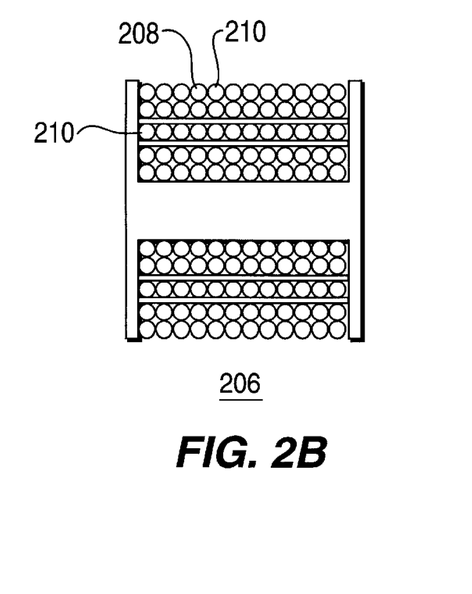
FIG. 2B shows an exemplary transformer for use in a power supply according to the principles of the invention.

In FIG. 2B, a transformer 206 wound with the bifilar winding technique is shown. The primary windings 208 and auxiliary windings 210 are interleaved so that adjacent wires always belong to a different winding. The secondary windings 210 again separate the primary 208 and auxiliary 210 windings. This bifilar winding technique minimizes leakage inductance and eddy current loss due to the proximity effect. For further reduction in losses due to the proximity effect, multifilar winding techniques can be used. In multifilar windings, each winding contains multiple strands of interleaved wires. These winding techniques were not previously used in soft-switcher topologies, due to the increase in interwinding capacitance caused by the close coupling between the primary and auxiliary windings.

Figure 3:
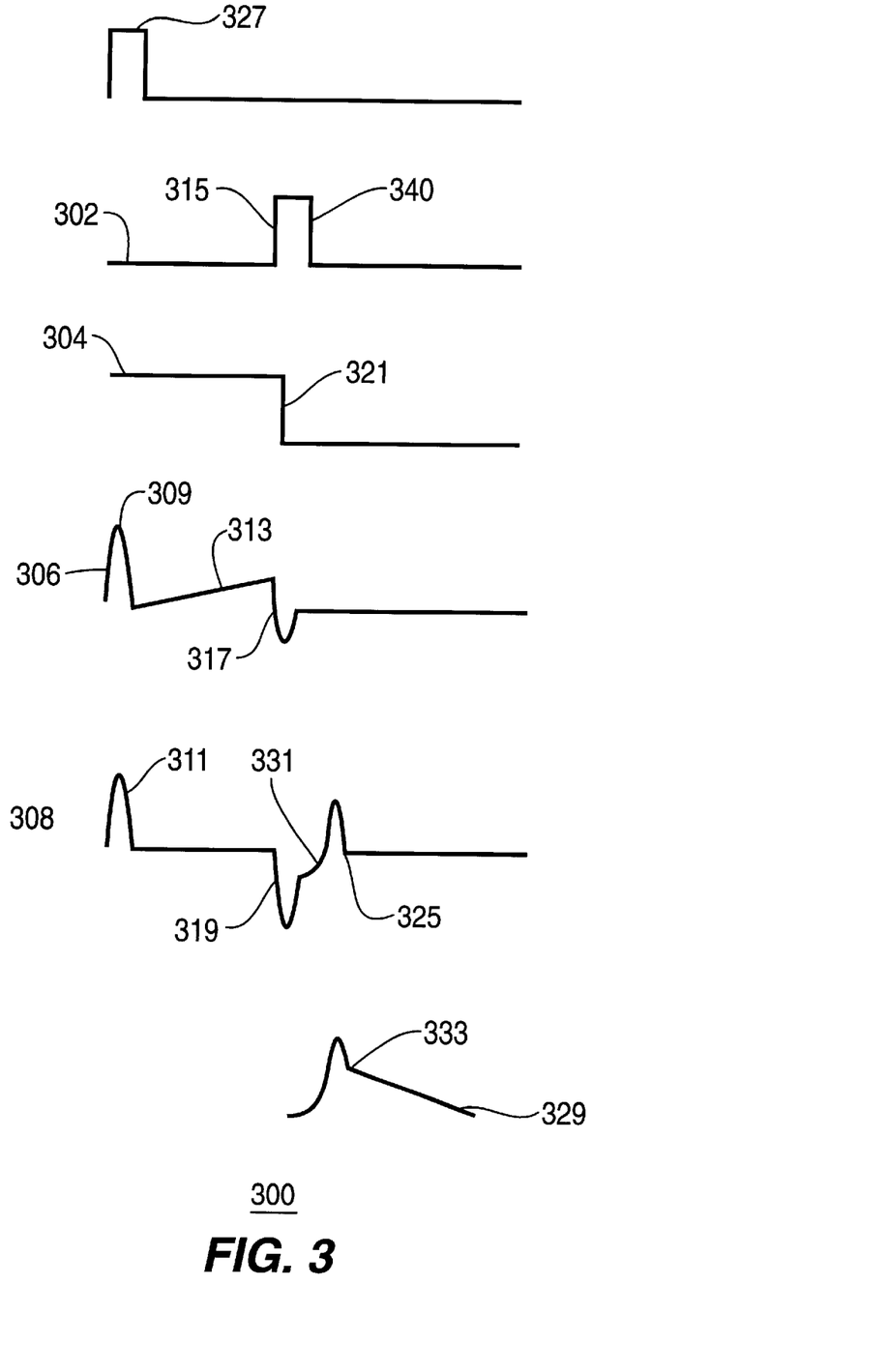
FIG. 3 shows exemplary timing diagrams according to the principles of the invention.

Operation of this exemplary soft-switcher is explained with reference to the timing diagrams of FIG. 3 as well as to FIG. 1. The switching cycle 300 begins with the closing of the primary switch 42. The auxiliary control signal 302 is low (the auxiliary switch 48 is open) and the primary control signal 304 is high. Current at a frequency set by the resonator 30 flows in the primary 14 and auxiliary 18 windings, until the resonant capacitor 34 stores a voltage equal to the voltage across the auxiliary winding 18. When these voltages are equal, the resonant current ceases to flow in either winding (there is no difference in potential to induce current flow). In the timing diagrams, this is illustrated by the half-cycle waves in the primary current wave diagram 306 and the auxiliary current wave diagram 308, at 309 and 311 respectively.

Once the resonant current terminates, the primary current climbs, as at 313, until terminated by the controller 56 in response to a feedback signal. Rather than terminate the primary current immediately, however, the controller 56 closes the auxiliary switch 48 (the control signal goes high, as at 315), causing the primary current and the auxiliary current to flow at the resonant frequency in the primary 14 and auxiliary windings 18, respectively. This drives these currents in a negative direction, as at 317 and 319 respectively. If the amplitude of the resonant current is high enough, the polarity of the current flowing in the primary switch 42 changes from positive to negative and the primary commutating diode 44 clamps the voltage across the switch 42 to zero (not shown) when the primary switch 42 is off. When the auxiliary switch current amplitude is less than the primary switch current, the converter acts as a partial soft switcher.

The auxiliary switch 48 remains on, as at 323, and the auxiliary continues to conduct current as the transformer develops a flyback voltage set by the secondary voltage. In other words, upon the opening of the primary switch 42, as at 321, the energy stored in the transformer 12 causes current to flow in the secondary winding 16. The auxiliary current polarity switches, as at 331, and the current rises until the voltage across the secondary winding 16 is clamped to the output voltage, as shown, in the secondary current wave diagram 329, at 333. The capacitor 34 discharges into the load at a resonant frequency determined by the LC network 30 and any leakage inductance and capacitance between the auxiliary and secondary windings. When the auxiliary current crosses zero, as at 325, the auxiliary commutating diode clamps the auxiliary switch 48 to zero voltage and the auxiliary switch 48 is off, as at 340.

B. Current Mode Control

Figure 4:
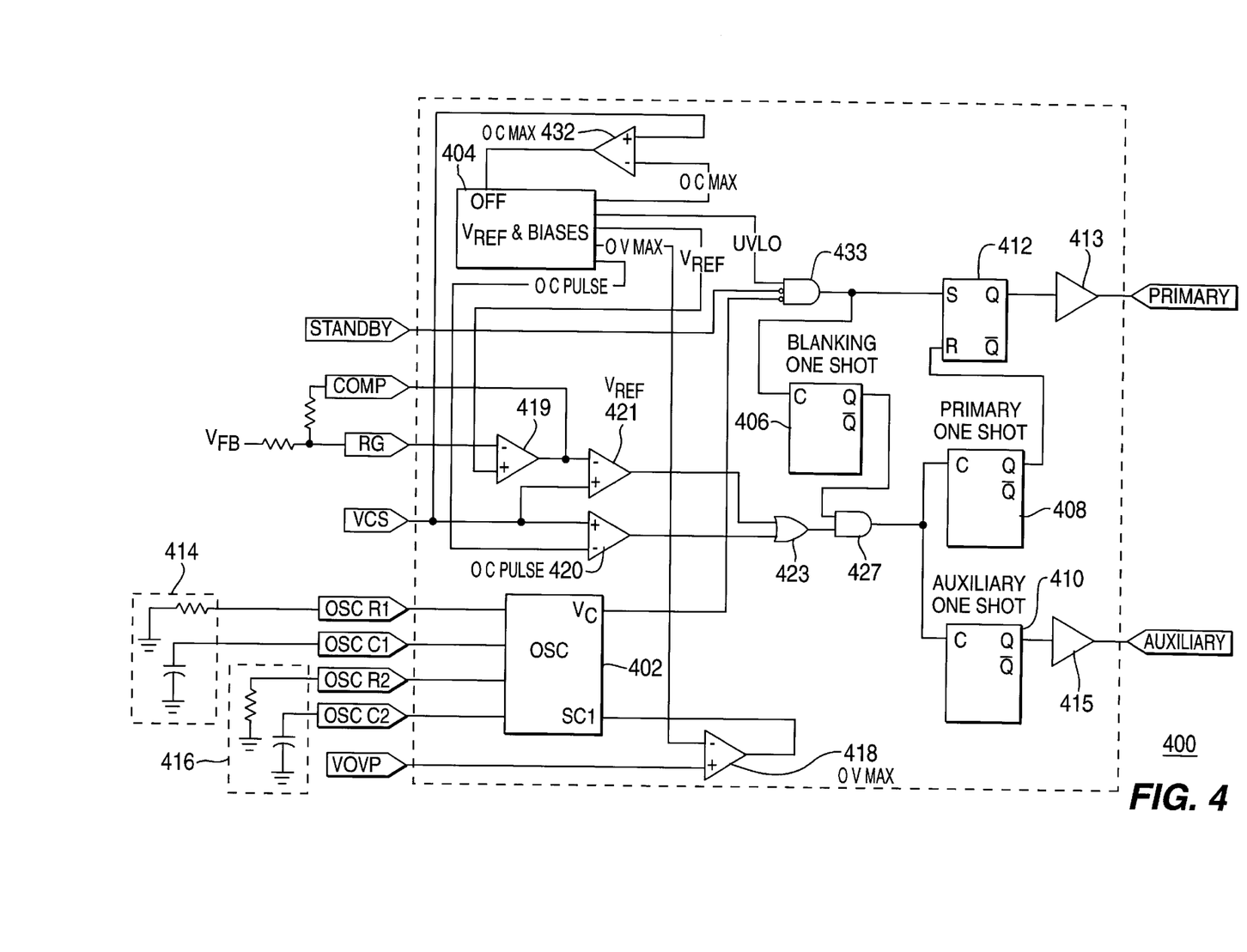
FIG. 4 shows the architecture of an exemplary controller according to the principles of the invention.

Referring now to FIG. 4 and to FIG. 1, an exemplary current mode controller 400 operable to control switching according to the principles of the invention is shown. The controller 400 implements PWM current mode control and pulse-by-pulse over-current protection. It comprises a programmable oscillator 402 for providing a common time base for the primary and auxiliary switch control. A voltage reference, bias generator 404 develops an internal temperature compensated voltage reference and an under voltage lock out signal (UVLO) that inhibits operation until the voltage reference is stable. UVLO drives an AND gate 433 which sets an RS flip-flop 412. A blanking pulse one shot 406, a primary switching signal one shot 408, an auxiliary switching signal one shot 410, and the RS flip-flop 412 implement the current control and develop the switch control signals. Buffers 413 and 415 buffer the blanking pulse one shot 406 output and the auxiliary one shot 410 output, respectively.

The oscillator 402 consists of two oscillators programmable with RC networks 414 and 416. One oscillator is programmed for the switching frequency and the other for some fraction of the switching frequency. The reduced frequency operation provides low power operation, such as in a standby mode for monitors. A comparator 418 controls selection of the oscillator frequency based upon an over voltage signal (VOVP) or the STANDBY signal. The comparator 418 has hysterisis so that no oscillations occur if VOVP is present.

The oscillator 402 output sets the timing for the one shot devices (406, 408 and 410) and the flip-flop 412. The initial rising transition of the oscillator 402 activates the primary switch 42 and forms a blanking pulse with the blanking pulse one shot 406. This prevents premature termination of the primary switch and overrides the over-current condition when the resonant pulse is active. As is known in the art, the blanking pulse width is programmable with the one shot 406. The timing of the blanking pulse in relation to the switch cycle is shown in FIG. 3, at 327.

When the blanking pulse terminates, the controller implements PWM control and over-current sensing. The current sense signal, VCS, is a voltage developed from the current in the primary switch 42. When VCS exceeds the magnitude of an error voltage, the PWM comparator 421 generates a pulse activating the auxiliary one shot 410 and the primary one shot 408. An Error Amplifier 419 compares a feedback voltage to a reference voltage, Vref, and drives the PWM comparator 421. This activates switching for the primary 42 and auxiliary 48 switches; however, the primary one shot 408 delays switching for approximately one quarter of a resonant cycle.

If an overcurrent condition exists, the OC Pulse comparator 420 generates a pulse, activating the auxiliary one shot 410 and the primary one shot 408. This condition usually occurs during power supply start-up. An OR gate 423 drives an AND gate 427 (with a non-inverting input) in response to the OC Pulse comparator 420 and the PWM comparator 421. The AND gate 427 is also responsive to the blanking pulse one shot 412, and it 427 drives the primary one shot 408 and auxiliary one shot 410.

For catastrophic over-current protection, VCS is compared to a fixed voltage generated in the voltage reference generator 404. The OC Max comparator 432 turns off the reference generator, disabling the controller 400, when the over-current voltage threshold is exceeded.

C. Voltage Mode Control

Figure 5:
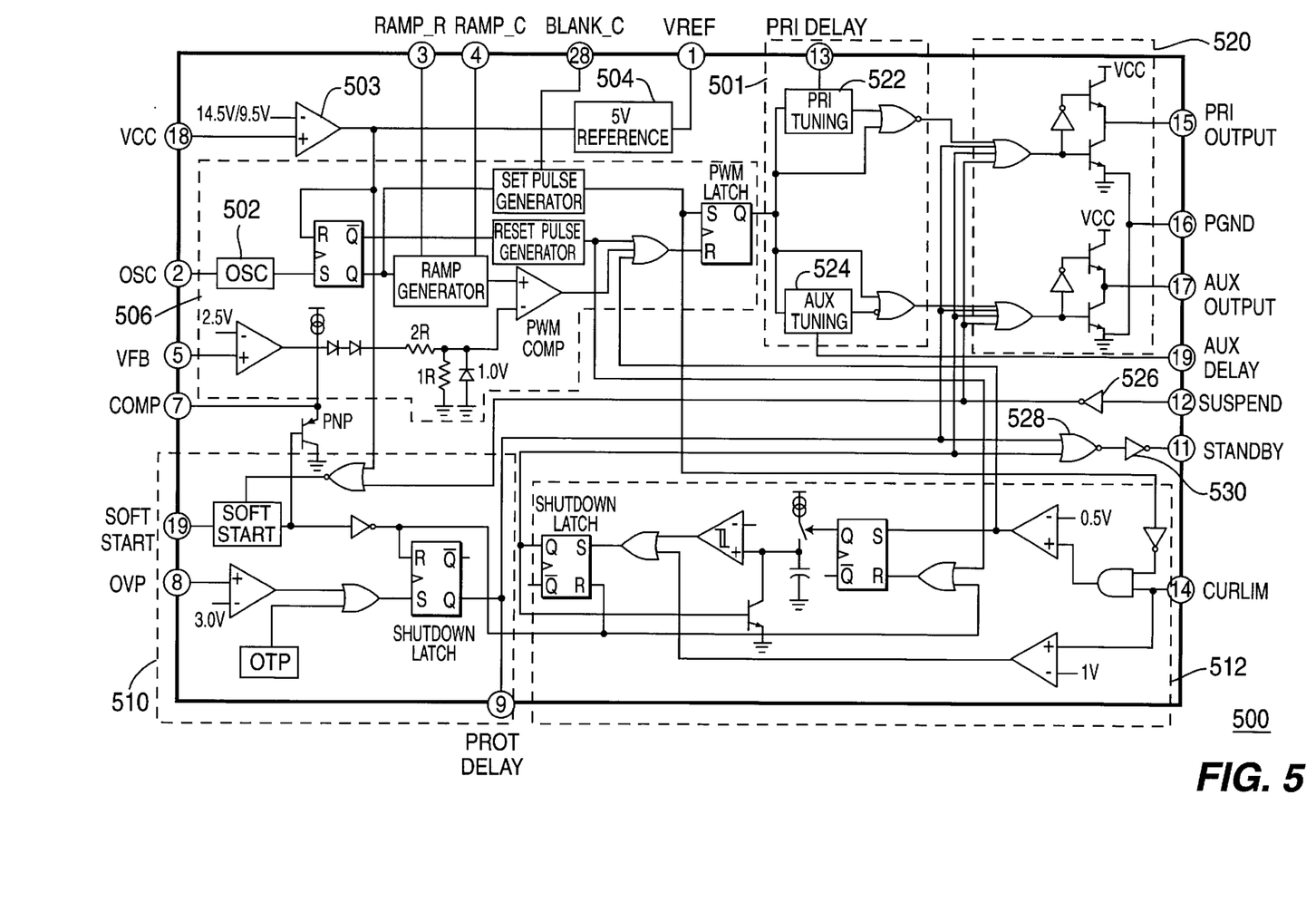
FIG. 5 shows the architecture of another exemplary controller according to the principles of the invention.

Still referring to FIG. 1, voltage mode control is provided by the voltage mode control topology shown in FIG. 5. The voltage controller 500 implements PWM control, pulse-by-pulse over-current protection, and catastrophic over-current protection. The voltage mode controller 500 comprises a programmable oscillator 502 for providing a common time base for the primary 42 and auxiliary switch 48 control. A voltage reference bias generator 504 develops an internal temperature compensated voltage reference. An under voltage lock out signal (UVLO) inhibits operation until the voltage reference is stable. The controller 500 also includes a Control Output Generator 506, a One Shot Timing Generator 501, an Over Voltage Protector 510, Output Networks 520 and a Current Protector 512. The Output Network 520 provides switch control signals in response to the One Shot Timing Generator 501.

Operation of the Control Output Generator 600 is explained with reference to the circuit diagram of FIG. 6A and the timing diagram of FIG. 6B. A T flip-flop 602 responsive to an oscillator 604 provides a timing pulse train 601. A ramp generator 606 responsive to the timing pulse train 601 generates a ramp pulse, as at 603, when the pulses in the timing pulse train 601 are high. An error amplifier 608 responsive to a voltage feedback from the output of the power supply (not shown) provides an error signal 605 to a PWM comparator 610. The comparator 610 compares the error signal 605 to the ramp train 607 provided by the ramp generator 606, and provides a pulse width modulated (PWM) signal 609 to an OR gate 612. The OR gate 612 is also responsive to a reset pulse generator 614 that provides a reset pulse train 611 and to a current limit signal 613. The output of the OR gate 612 controls a PWM latch 624. The latch output 615 signals the One Shot Timing Generator (not shown).

The Control Output Generator 600 controls switching in response to a "set pulse" signal 617, the PWM signal 609, the reset pulse generator signal 611 and a current limit signal 613. The set pulse generator 616 provides the "set pulse" (SP) pulse train 617 in response to the timing pulse train 601. The width of the pulses in the SP pulse train 617 are set by capacitor C2. The rising edge of these pulses 617 set the latch, which raises the latch output high 615 until the latch 614 receives a reset signal from the OR gate 612. The pulse width of the SP pulses 617 should be chosen to avoid setting the latch due to noise.

The reset signal is present when either the PWM signal 609, the current limit signal 613, or the reset pulse generator signal 611 is high. In normal operation, the PWM signal 609 controls the duty cycle. In anomalous conditions, the reset pulse generator 614 sets the maximum duty cycle at, for example, the oscillator frequency, or the current limit signal 613 terminates the control signal. The PWM latch 614 under normal running conditions outputs a modulated pulse train to the One Shot Timing Circuit shown in FIG. 7.

Figure 6A:
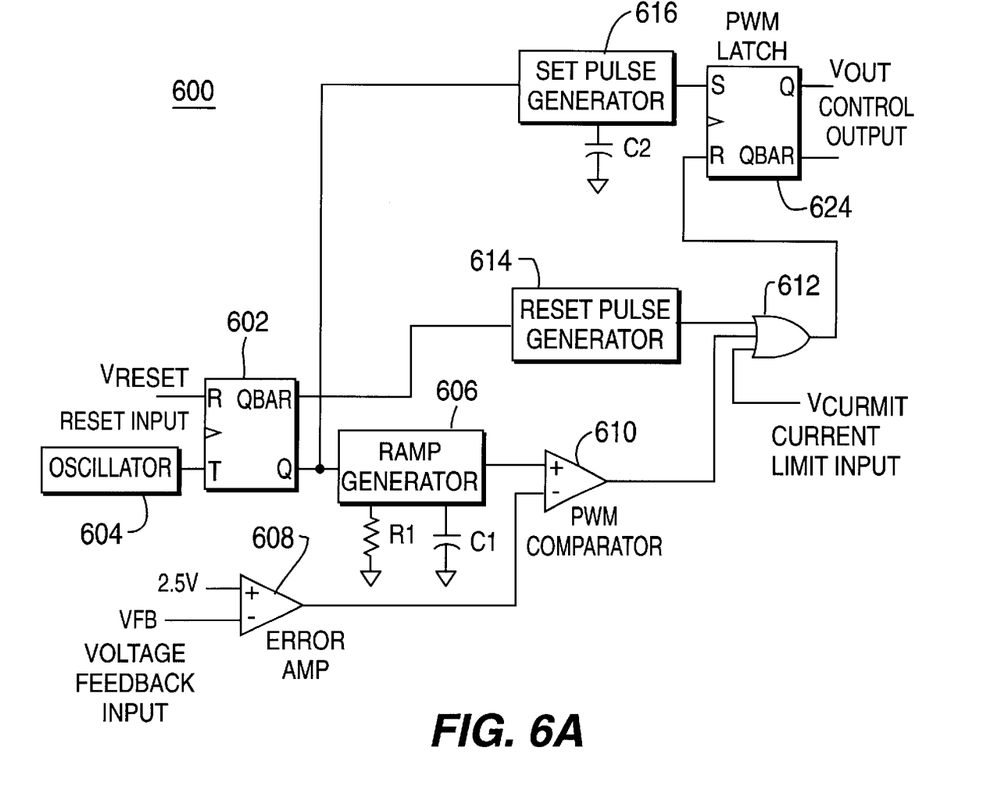
FIG. 6A shows an exemplary circuit according to the principles of the invention.
Figure 6B:
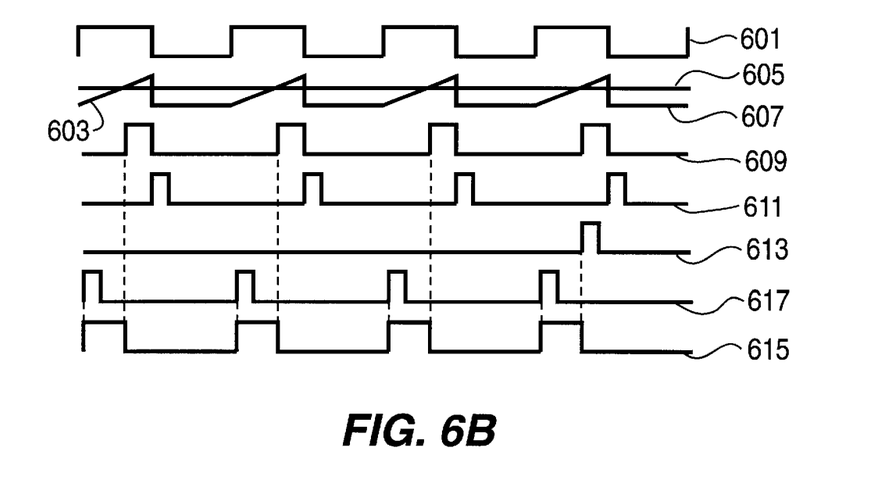
FIG. 6B shows an exemplary timing diagram for the circuit of FIG. 6A.
Figure 7:
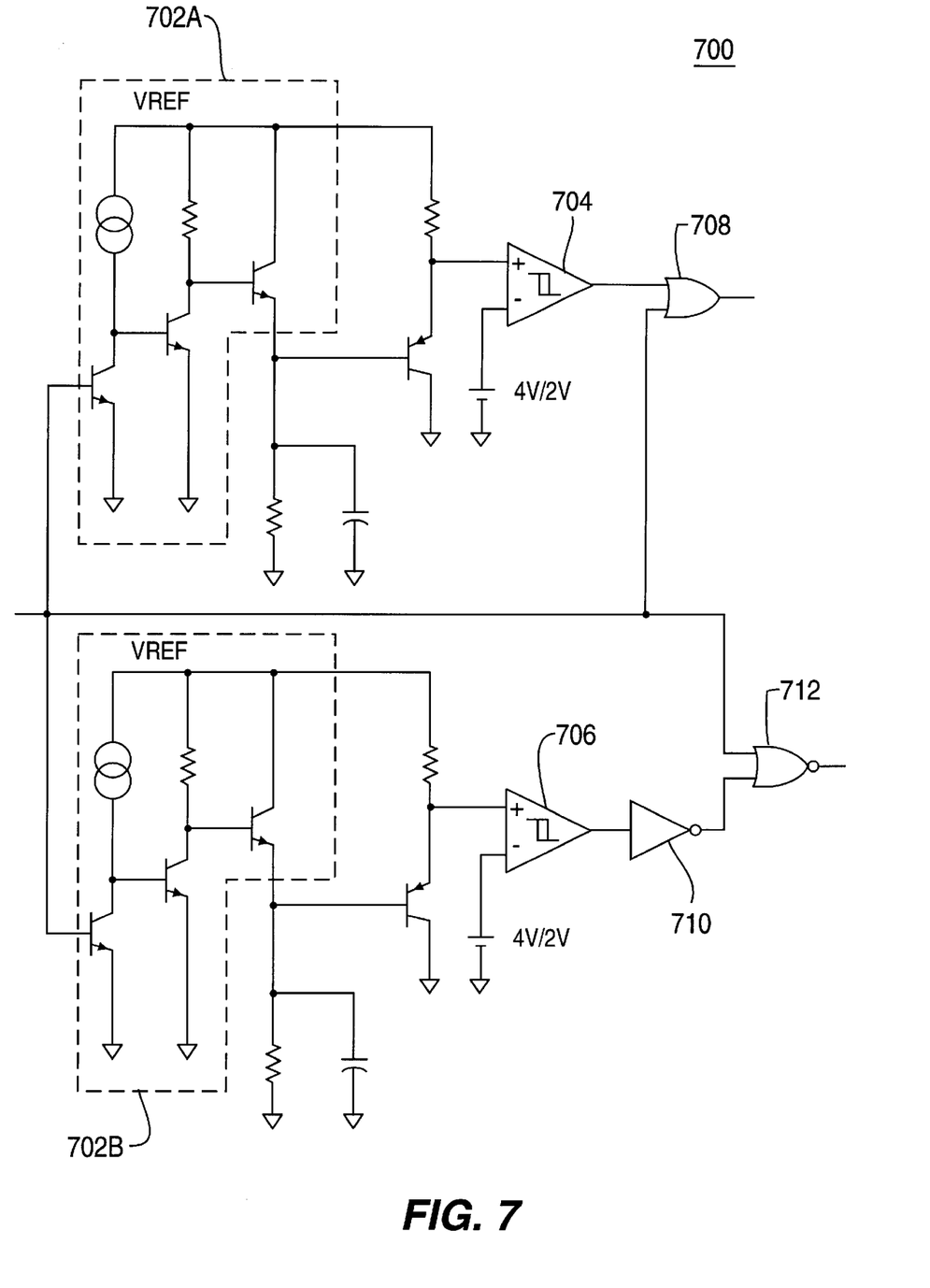
FIG. 7 shows an exemplary circuit according to the principles of the invention.

Referring now to FIG. 7 as well as FIGS. 6A and 6B, the circuit 700 produces the primary control signal and the auxiliary control signal. The input networks 702A and 702B are responsive to the PWM latch 614. The one shot capacitors CM1 and CA1 are charged through transistors QM3 and QA3, respectively, which are responsive to the input networks 702A and 702B. When these transistors are off, the one shot capacitors discharge, turning on the PNP transistors QM4 and QA4. The periods of the one shots are programmable with resistors RM3 and RA4.

When the transistors QM4 and QA4 are on, two one-shot comparators 704 and 706 (with hysterisis) compare the discharging voltages to a threshold voltage. The one shot periods end when the capacitors discharge to the threshold of the one-shot comparators 704 and 706. An OR gate 708 is responsive to the output of the one-shot comparator on the primary side and to the PWM latch 614. When the PWM latch signal 615 is high or when the comparator 704 outputs a high signal, the primary control signal is high. On the auxiliary side, an inverter 710 is interposed between the auxiliary one-shot comparator 706 and a NOR gate 712. When the comparator 706 is high or when the PWM latch 614 is high, the NOR gate 712 outputs low.

The duration of the one-shot comparator outputs can be adjusted by programming the periods of the one-shot capacitors. This permits delaying termination of the primary current when the auxiliary switch is closed (the control signal is high, as at 315 of FIG. 3), causing the resonant current to flow in the primary 16 and auxiliary windings 18. This drives the primary and auxiliary currents in a negative direction, as at 317 and 319 of FIG. 3 respectively.

Figure 8:
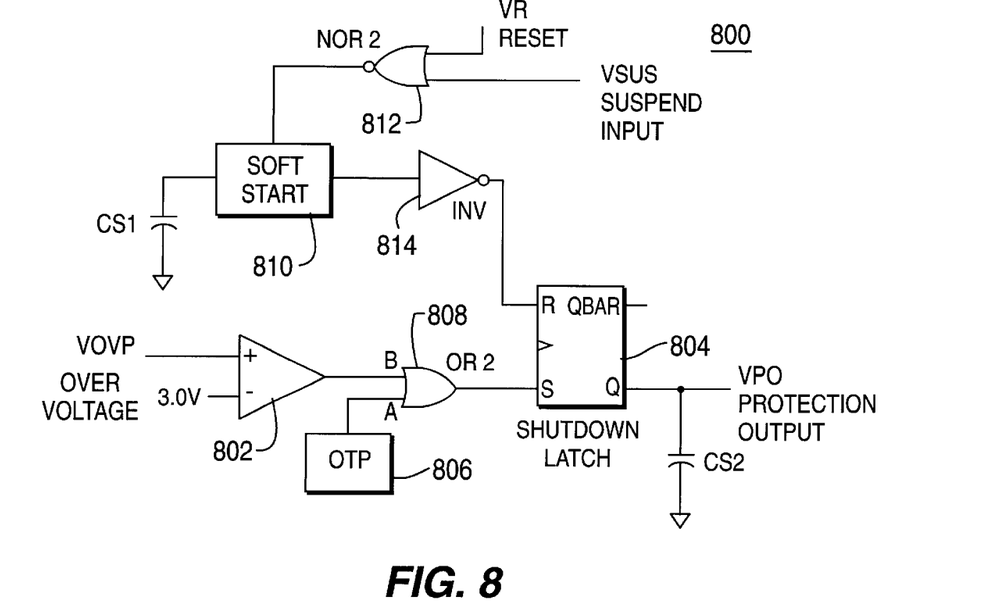
FIG. 8 shows an exemplary circuit according to the principles of the invention.

The Over Voltage Protector is shown in FIG. 8. This circuit 800 protects the power supply from an over-voltage condition on the secondary side and from an over-temperature condition. It also provides for initiating a soft-start circuit. For over-voltage protection, a comparator 802 responsive to an OVER VOLTAGE signal drives a shut-down latch 804 when the OVER VOLTAGE signal exceeds the comparator threshold. The latch 804 disables the drivers of the primary and auxiliary switches (not shown). With respect to over-temperature conditions, the OTP circuit 806 provides an over-temperature signal which also sets the shutdown latch 804. The OTP signal and comparator 802 output are multiplexed through an OR gate 808.

In addition, a RESET signal or SUSPEND INPUT signal activates the soft start circuit 810 through a NOR gate 812. This enables the soft start mode of operation. In this mode, regulation occurs at the minimum duty cycle until feedback control enables. During soft start mode operation, the error amplifier output is low and the soft start circuit resets the shutdown latch 804 through an inverter 814. The soft start circuit limits switch current by overriding output of the error amplifier for a time set by an RC network at the soft start input.

Figure 9:
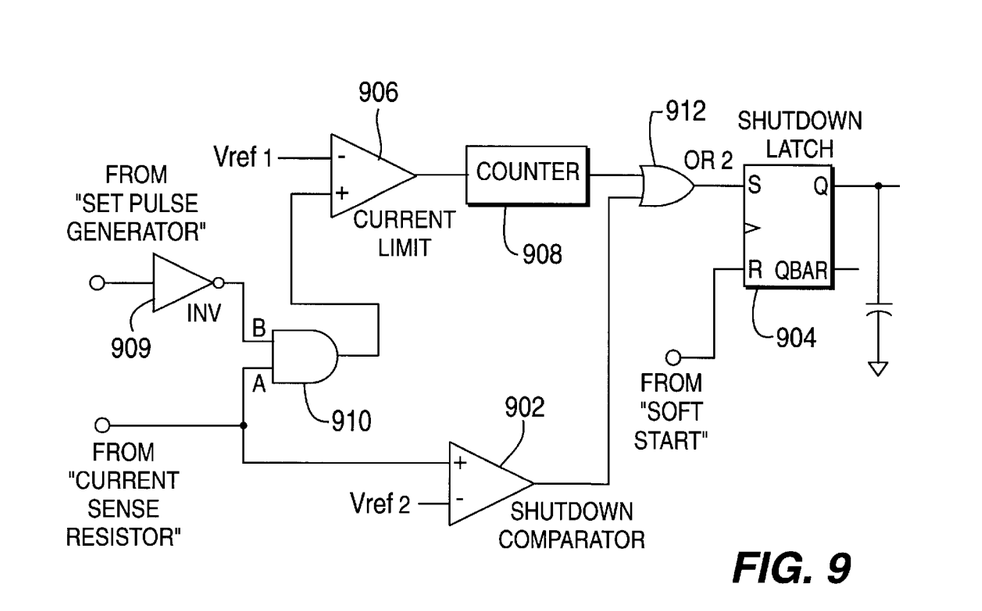
FIG. 9 shows an exemplary circuit according to the principles of the invention.

The Current Protector, shown in FIG. 9, provides current limiting and over-current protection. The circuit 900 is implemented when there exists a prolonged over-current condition due to anomalous conditions in the primary, secondary or load. Over-current protection is provided by a shut down comparator 902 which causes a shut down latch 904 to set when a current sense signal exceeds a threshold. For current limiting, a current limit comparator 906 goes high when the current sense signal exceeds the current limit threshold but is less than the over-current threshold. This signal resets the PWM latch (not shown) and increments a counter 908. If the current limit threshold is exceeded a given number of times, the counter 908 sets the shutdown latch 904.

The current limit comparator 906 is also responsive to a set pulse generator (not shown). When the set pulse signal is high, an inverter 909 inverts the signal and the input to the current limit comparator 906 is low. This implements a programmable blanking pulse when the amplitude of the resonant current in the primary switch 42 exceeds the peak magnetization current (which occurs at the start of a switch cycle). The AND gate 910 and the OR gate 912 provide multiplexing for the current limit comparator 906 and shut-down latch 904, respectively.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A soft-switching power supply, comprising:
   a transformer having at least an auxiliary winding;
   at least an auxiliary switch network; and
   a resonator operably coupled to the auxiliary switch network and a leg of the auxiliary winding, the transformer having an interwinding capacitance substantially shunted to a ground via another leg of the auxiliary winding.

2. The power supply of claim 1 wherein the transformer is a bifilar transformer.

3. The power supply of claim 1 wherein the transformer is a multifilar transformer.

4. The power supply of claim 1 wherein the transformer includes a primary winding and a secondary winding, the power supply further comprising:
   a primary switch network serially coupled to the primary winding;
   a controller responsive to a feedback signal for switching the primary switch network and the auxiliary switch network; and
   a rectifier responsive to the secondary winding, wherein the rectifier outputs a regulated voltage.

5. The power supply of claim 4 wherein the feedback signal is a voltage provided by the rectifier.

6. The power supply of claim 4 wherein the feedback signal is a primary switch network current.

7. The power supply of claim 4 wherein the controller causes the primary switch network to switch when the primary switch network current is at a substantially optimum level.

8. The power supply of claim 4 wherein the controller causes the primary switch network to switch when a magnitude of the primary switch current is between approximately 40% and approximately 60% of a peak value.

9. The power supply of claim 4 wherein the controller causes the primary switch network to open approximately one-quarter cycle of the resonant frequency after the auxiliary switch network closes.

10. A method for regulating a soft-switching power supply having a multifilar transformer including a primary winding, an auxiliary winding and a secondary winding, the steps comprising:
    conducting a primary current in the primary winding and an auxiliary current in the auxiliary winding at a resonant frequency until a voltage across the auxiliary winding reaches a threshold voltage;
    determining a primary current termination requirement according to a feedback signal;
    terminating the primary current approximately one-quarter of the resonant frequency cycle after determining the primary current termination requirement; and
    conducting a secondary current in the secondary winding at substantially the resonant frequency.

11. The method of claim 10 comprising the further step of driving the primary current toward zero in response to the primary current termination requirement.

12. The method of claim 10 wherein the step of terminating the primary current terminates the primary current when a magnitude of the primary current is between approximately 40% to approximately 60% of a peak value.

13. The method of claim 10 wherein the multifilar transformer is a bifilar transformer.

14. The method of claim 10 wherein the feedback signal is provided by the primary current.

15. The method of claim 10 wherein the feedback signal is provided by an output voltage.

16. An electronic device comprising a regulated power supply, the power supply including:
    a multifilar transformer having at least an auxiliary winding, the auxiliary winding having a first leg and a second leg;

a resonator coupled to the second leg of the auxiliary winding; and an auxiliary switch network coupled to the second leg of the auxiliary winding and selectively operable to cause a resonant current to flow in the transformer, the first leg of the auxiliary winding substantially shunting an interwinding capacitance to a ground when the resonant current flows in the transformer.

17. The power supply of claim 16 wherein the transformer includes a primary winding and a secondary winding, the primary winding first leg being coupled to a voltage, the power supply further including:

a primary switch network coupled to the primary winding second leg and the voltage;

a controller responsive to a feedback signal for switching the primary switch network and the auxiliary switch network; and a rectifier responsive to the secondary winding, wherein the rectifier outputs a regulated voltage.

18. The power supply of claim 16 wherein the electronic device is one selected from the group comprising monitors, televisions, cellulars, telephones, personal computers, communications equipment, radar and audio equipment.

19. The power supply of claim 17 wherein the controller causes the primary switch network to switch when the primary switch current is at a substantially optimum level.

20. The power supply of claim 17 wherein the controller causes the primary switch network to switch when a magnitude of the primary switch current is between approximately 40% and approximately 60% of a peak value.

21. A system comprising a monitor, the monitor having a switching power supply, the switching power supply including:

a transformer having an interwinding capacitance; and a resonator operable to resonate at least one current in the transformer, the interwinding capacitance being substantially shunted to a ground.

* * * * *